United States Patent
Adams et al.

(10) Patent No.: US 6,577,415 B1
(45) Date of Patent: Jun. 10, 2003

(54) OPTICAL ADD-DROP MODULE WITH LOW LOSS AND HIGH ISOLATION

(75) Inventors: Laura Ellen Adams, Basking Ridge, NJ (US); Jon Anderson, Brielle, NJ (US); Robert Mario Broberg, San Francisco, CA (US); Gadi Lenz, Fanwood, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/333,407

(22) Filed: Jun. 15, 1999

(51) Int. Cl.[7] .................................................. H04J 14/02
(52) U.S. Cl. ........................ 359/127; 359/110; 359/124; 359/130
(58) Field of Search ................................ 359/110, 124, 359/130, 127

(56) References Cited

U.S. PATENT DOCUMENTS

| | | | | |
|---|---|---|---|---|
| 5,532,864 A | | 7/1996 | Alexander | 359/177 |
| 5,712,717 A | * | 1/1998 | Hamel et al. | 359/130 |
| 5,822,095 A | | 10/1998 | Taga et al. | 359/127 |
| 6,038,046 A | * | 3/2000 | Kaneko et al. | 359/130 |
| 6,115,154 A | * | 9/2000 | Antoniades et al. | 359/110 |
| 6,301,031 B2 | * | 10/2001 | Li | 359/124 |
| 6,348,984 B1 | * | 2/2002 | Mizrahi | 359/124 |

FOREIGN PATENT DOCUMENTS

| | | | |
|---|---|---|---|
| WO | WO9914879 | 3/1999 | H04J/14/00 |

OTHER PUBLICATIONS

Rancourt, J. D., *Optical Thin Films Users' Handbook*, McGraw–Hill, New York, (1987).
Macleod, H.A., *Thin–Film Optical Filters*, 2$^{nd}$ Ed., McGraw–Hill, New York, (1989).
Scobey, M.A. et al., "Stable ultra–narrow bandpass filters," *Proceedings of SPIE's International Symposium*, (1994).
Scobey, M.A. et al., "Improved Temperature and Humidity Stability of Ultra–Narrow Band Filters," *Proceedings of Society of Vacuum Coaters* (1994).

* cited by examiner

Primary Examiner—Leslie Pascal
Assistant Examiner—Dzung Tran

(57) ABSTRACT

An optical add-drop module (OADM) includes in the through-path exactly two thin-film filters (TFFs) having respective passbands that approximately coincide in wavelength. Each TFF has a respective across-the-band isolation level, representing the smallest isolation achieved at any wavelength within the passband. The respective reflection characteristic curves of the two TFFs are at least partially complementary, such that the OADM isolation level exceeds the logarithmic sum of the across-the-band isolation levels of the respective TFFs.

9 Claims, 2 Drawing Sheets

FIGURE 4
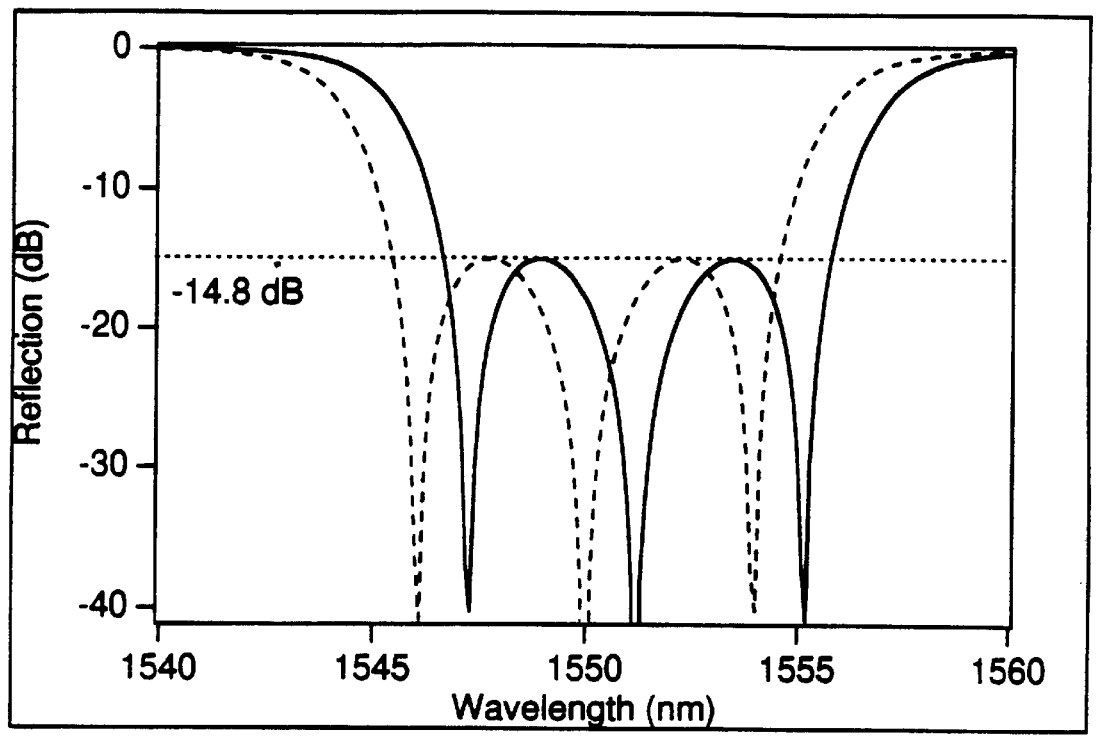
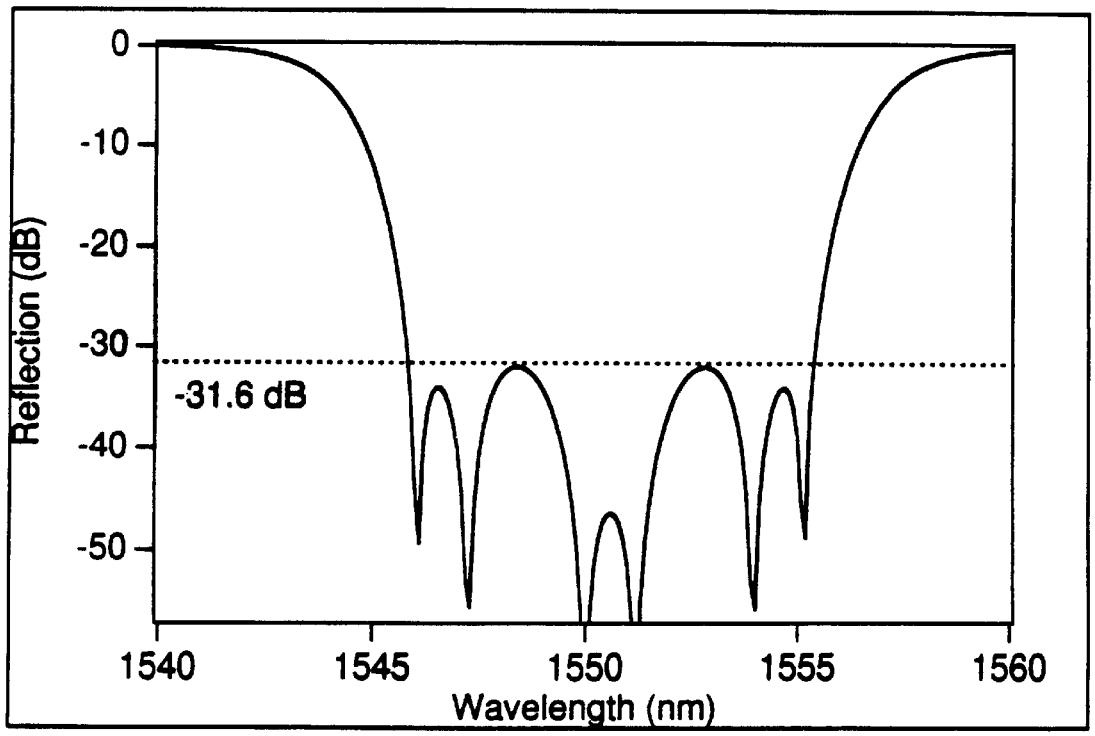
FIGURE 5

OPTICAL ADD-DROP MODULE WITH LOW LOSS AND HIGH ISOLATION

FIELD OF THE INVENTION

The present invention relates generally to passive optical devices for channel selection, and more particularly, to devices in which dielectric thin-film filters are used for channel selection.

BACKGROUND OF THE INVENTION

There is currently a market need, experienced by, for example, telephone carriers and cable operators, to provide short-haul transmission of internet protocol (IP) packets among interconnected nodes of a network that are typically spaced apart by 20 km or less. Proposed systems send IP packets, via a SONET interface, over a fiber-optic transmission medium using wavelength division multiplexing (WDM). A particular wavelength channel is assigned to each node. At each node, optical demultiplexing is required to extract the received data from the medium in the channel of interest, and optical multiplexing is required to inject the transmitted data into the medium in the channel of interest.

The optical components that effectuate optical multiplexing and demultiplexing add cost to the network installation, and in operation, they also add optical losses that accumulate over the network. For greater profitability, it is desirable both to reduce installation cost, and to reduce the accumulated losses that would otherwise limit transmission distances. For both purposes, it would be advantageous to reduce the number of optical components at each node that perform optical multiplex-demultiplex functions.

One known device for providing the multiplex-demultiplex function described above is an optical add-drop module (OADM) using in-line dielectric thin-film filters (TFFs). Such a device is represented in FIG. 1. Very briefly, incoming traffic on optical fiber 10 is incident on drop filter 15. Signals in undesired wavelength channels, i.e. all but the channel assigned to the node of interest, are reflected into bypass optical fiber 20. From fiber 20, these signals are incident on add filter 25 and reflected into optical fiber 30, from which they propagate downstream and away from the node of interest. Signals in the channel of interest are transmitted through filter 15 to receiver 35. Signals in the channel of interest from transmitter 40 are transmitted through filter 25 into optical fiber 30.

Some incoming optical power in the channel of interest may leak through the OADM by reflection from filters 15 and 25 and transmission into fiber 30. Such leakage is undesirable because it leads to interference in that channel. The attenuation of the undesired power, relative to the desirably transmitted power in the channel, is referred to herein as channel isolation. Those skilled in the art will appreciate that the term adjacent channel isolation is often used to denote a measure of the suppression of channel crosstalk at receiver 35. What we mean by channel isolation, however, is the isolation provided by virtue of the reflections from filters 15 and 25. Such isolation is also sometimes referred to as reflection isolation.

In some cases, the add and drop filters fail to provide sufficient channel isolation. In those cases, it is customary to add a third filter 45, which supplements filters 15 and 25 by continuing the bypass path from fiber 20 to fiber 20'. The additional reflection from this third filter further reduces the power in the local add/drop channel that is transmitted into fiber 30, and thus further increases the channel isolation.

There are certain drawbacks to the use of a third filter, such as filter 45, in the bypass fiber. Such a filter adds some loss to all of the traffic being routed through the bypass fiber, and it adds component cost to the fiber-optic network.

SUMMARY OF THE INVENTION

Represented in FIG. 2 is a pair of characteristic curves for an illustrative TFF. Curve 50 is a transmission characteristic, and curve 55 is a reflection characteristic. Evident in curve 55 are ripple features 60 having peaks 61 and valleys 62. A ripple peak corresponds to a wavelength, within the transmission passband of the TFF, which is also partially reflected. Thus, the TFF affords somewhat less isolation near ripple peaks than it does near ripple valleys. Herein, we use the term across-the-band isolation to refer to the smallest isolation achieved at any point within the passband of a given TFF.

We have found that the combined isolation afforded in an OADM by an add filter and a drop filter can be improved by selecting a pair of filters having nominally similar characteristics, but having relatively displaced ripple features, such that at least one ripple peak of the add filter falls at approximately the same wavelength as a ripple valley of the drop filter and vice versa. The resulting improvement is sufficent to obviate the need for a third filter in the bypass fiber, even for some highly demanding applications. Thus, appropriate matching of the add and drop filters can lead to reduced loss in the network, and reduced network cost.

Accordingly, the invention in one embodiment is an OADM having a passband and a through-path, and in the throughpath, exactly two broadband TFFs having nominally similar transmission and reflection characteristics. In this context, the throughpath is the path taken by traffic that is not added or dropped. With reference to FIG. 1, it is the path from fiber 10 to fiber 30 via fibers 20 and 20'. The respective TFFs are selected to have at least partially complementary reflection characteristic curves, such that at least some ripple peaks in the characteristic curve of one TFF overlap ripple valleys in that of the other TFF. The selection of TFFs is further characterized in that the OADM achieves a level of channel isolation over the entire said passband that is greater than that achievable by pairing either of the individual TFFs with an identical counterpart.

BRIEF DESCRIPTION OF THE DRAWING

FIG. 4 shows reflection characteristic curves for two computationally modeled TFFs that are nominally similar, but have a mutual center-wavelength offset of 1.2 nm. Isolation achievable with either of these TFFs is indicated on the figure.

FIG. 5 shows the composite reflection characteristic curve of the TFFs of FIG. 4 cooperating in an OADM. The isolation achievable from this combination of two TFFs is indicated on the figure.

DETAILED DESCRIPTION

We have found that one answer to the need for an economical short-haul network, as described above, is a dual-ring, bidirectional optical fiber transmission system supporting widely spaced coarse WDM channels. The ring interconnects the nodes with a hub, which manages traffic entering and leaving the ring. Typically, a relatively wide spacing of the channels, on the order of 20 nm, enables the use of very low cost transceivers and avoids the need for temperature control in, e.g., the laser transceivers. Details of such a ring network can be found in copending application of L. Adams, J. Anderson, W. Brinkman, and R. Broberg, filed on Jun. 15, 1999 under the title "Wideband Optical Packet Ring Network", and assigned to the same assignee as the present invention.

OADMs using TFFs are especially suited to such a network, because TFFs are readily made with a bandwidth wide enough to accommodate the wavelength drift normally associated with temperature changes in uncooled lasers. The signals in the various channels are coupled to the TFFs in each node by a standard optical transceiver, which performs modulation and demodulation. Each filter passband can be populated with multiple dense wavelength division multiplexed (D-WDM) channels, so that the capacity of traffic that can be handled at each node can be easily upgraded. The transceiver is, in turn, coupled to a packet framer, which supplies received packets to, and receives outgoing packets from, a conventional Layer 3 routing engine.

While the preceding description of an embodiment of the present invention relates to an Internet Protocol (IP) network carrying IP packets, it is to be understood that the present invention can be used in connection with many diverse types of networks and with the transmission of different types of information bearing packets or signals. Thus, as used herein, the term "packets" includes, but is not limited to, data packets (such as are used in asynchronous transfer mode (ATM), synchronous transfer mode (STM), and/or internet protocol (IP) networks), as well as other information bearing signals, sometimes referred to as "frames", that are found, for example, in streaming audio and/or video applications.

Figure 1:
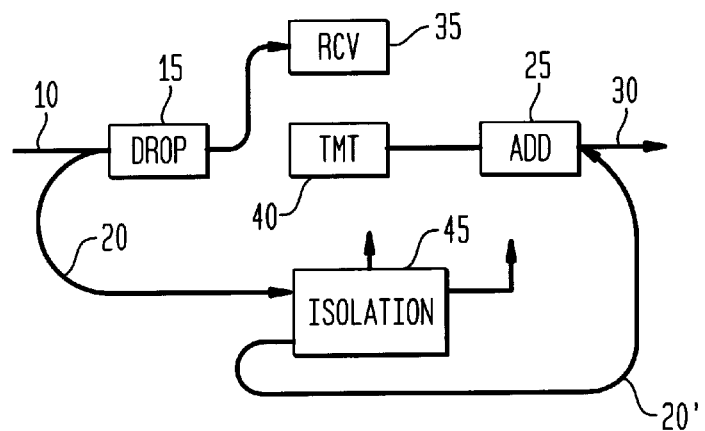
FIG. 1 is a simplified schematic drawing of a portion of a fiber-optic network, including an optical add-drop module (OADM) of a known kind, using dielectric thin-film filters (TFFs).
Figure 2:
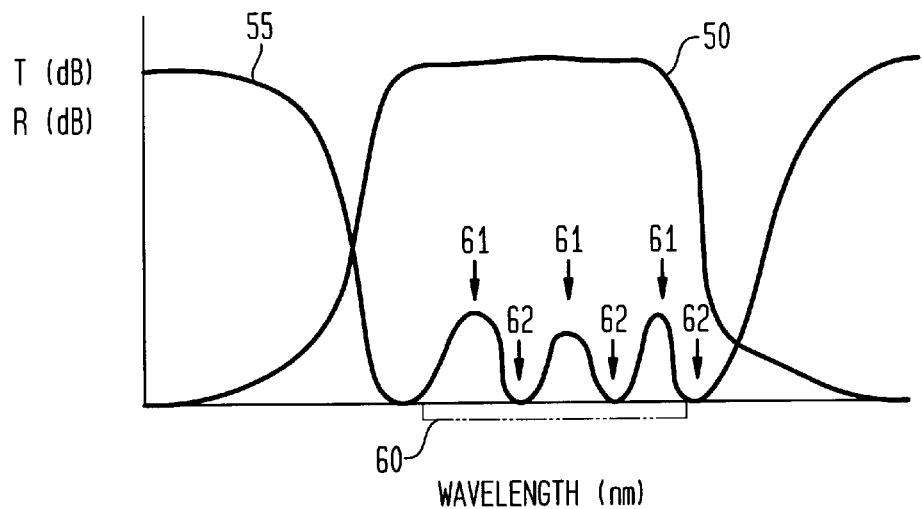
FIG. 2 is a pair of characteristic curves for an illustrative TFF of a kind useful in the OADM of FIG. 1. In each curve, transmitted or reflected optical power, in decibels, is plotted against wavelength.
Figure 3:
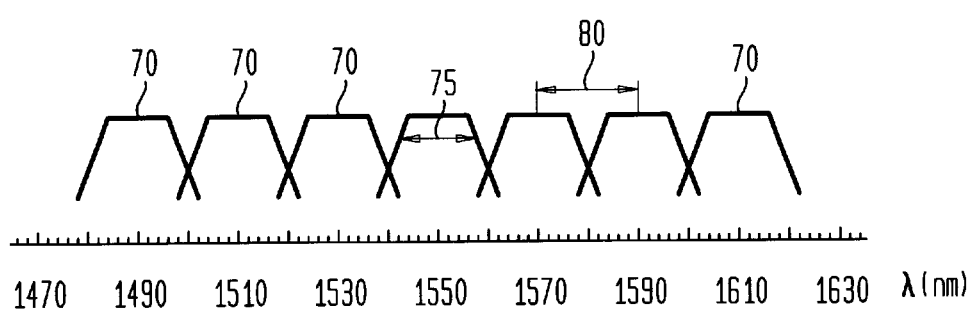
FIG. 3 is a diagram that schematically illustrates an exemplary set of coarse WDM channels useful in the operation of an optical WDM ring network.

A practical system has a finite operating bandwidth, within which all of the wavelength channels must fit. The total number of possible channels is limited by this operating bandwidth and by the spacing between channels. This is illustrated in FIG. 3, in which each of several wavelength channels is represented by a respective bandpass transmission characteristic 70. The operating band of the network is characterized by a channel bandwidth 75 and a channel spacing 80.

In an illustrative network, there are seven channels having respective center frequencies corresponding to wavelengths of 1490, 1510, 1530, 1550, 1570, 1590 and 1610 nm. Each of the respective channels has a bandwidth of about 13 nm. A channel spacing of 20 nm advantageously enables the use of inexpensive transceivers comprising lasers that require little or no temperature control. In addition, broad passband filters made by TFF technology easily accommodate wavelength drift that occurs with temperature variations of uncooled lasers. Moreover, a filter passband of 13 nm width can readily accommodate 16 D-WDM channels having 100-GHz spacing. As noted, this allows for capacity to be upgraded at each node by adding D-WDM channels.

More generally, an exemplary range of OADM passbands useful in this context is 1–20 nm. An exemplary range for OADM center wavelengths is 1290–1610 nm. In practice, of course, these ranges will be limited by channel spacings, light sources, and other design considerations.

It will be evident from the figure that if channels are spaced too closely together, the transmission characteristics of OADMs in neighboring channels may overlap, leading to unacceptable channel crosstalk. For a fixed channel spacing, increasing the filter passband makes it necessary to steepen the sides of the filter characteristic curve in order to satisfy required limits on adjacent channel crosstalk. However, the steeper the filter edge, the more ripple is introduced in the passband. This, in turn, tends to reduce the amount of isolation available for, e.g., meeting required limitations on coherent crosstalk.

By way of illustration, FIG. 4 shows reflection characteristic curves for computationally modeled TFFs having respective central wavelengths of 1550.0 nm and 1551.2 nm, and passbands of 13 nm. Measurement of the distance from the 100% reflection level to the top of the highest ripple peak of each reflection curve shows that the isolation achievable across the passband for each filter is 14.8 dB. Thus, an OADM using two identical such filters, without further filtering in the bypass fiber, would achieve twice this isolation, or 29.6 dB.

The composite reflection characteristic curves for the same two TFFs, acting together in an OADM, is shown in FIG. 5. Because the ripple features of the respective TFFs do not occur at the same wavelengths, the two filters as combined in an OADM achieve an isolation of 31.6 dB, which is greater than that which would be achieved by pairing either TFF with an identical counterpart.

More generally, the isolation achieved by any pair of TFFs, at a given wavelength, is the sum of the isolations (in decibels) achieved at that wavelength by the individual TFFs. Improved across-the-band isolation can be achieved when at least some ripple peaks of one TFF at least partially overlap ripple valleys of the other TFF. In particular, there will generally be improvement if mutual reinforcement is avoided between the portions of the respective characteristic curves that correspond to relatively low isolation. As noted, one way to achieve such improvement is to pair TFFs having similarly shaped reflection characteristics, but having center wavelengths that are offset by an appropriate amount. Another way is to use TFFs having the same, or nearly the same, center wavelength, but having different characteristic curves as the result, e.g., of manufacturing uncertainties.

Appropriate pairs of TFFs may be explicitly designed to have mutually compensating reflection characteristics, exemplarily by providing a designated offset of the center wavelength. An exemplary range for offsets useful in this regard is 1%–25% of the TFF passband. An alternative exemplary range is 0.1–5 nm. In practice, of course, these ranges may be limited by the choice of center wavelengths, OADM passbands, and other design considerations.

Alternatively, when a variety of TFFs having different characteristic curves are available, it is a straightforward task to select one or more pairs that have mutually compensating curves.

Such task can be carried out, e.g., with the help of a computer in which the various digitally sampled characteristic curves have been stored. Under the control of an appropriate program, such a computer can readily compute the composite curves for many pairs drawn from a population of manufactured filters, and can readily indicate which such composite curves meet specified criteria for isolation.

It should be noted that techniques for making TFFs according to specified requirements are well known. Conventional vacuum deposition techniques, such as sputtering techniques, are used to deposit alternating layers of dielectric material on substrates of, typically, optical glass. Suitable dielectric materials include silica and titania. The theory of TFFs is discussed in such books as H. A. Macleod, *Thin-Film Optical Filters*, 2d Ed., McGraw-Hill, N.Y., 1989 and J. D. Rancourt, *Optical Thin Films User's Handbook*, McGraw-Hill, N.Y., 1987.

However, as noted, there are uncertainties in the manufacturing process. Because of these uncertainties, it is rare for two nominally identical TFFs to have exactly the same characteristic curves. Instead, substantial variation is seen in the ripple structure of the reflection curves. Thus, even random variation provides an opportunity for judicious matching of TFFs for improved isolation.

Our computational simulations, assuming individual across-the-band isolations of 14–15 dB, have indicated that pairing of TFFs as described here can improve isolation in the OADM by 1 decibel, several decibels, or even more, over what would be expected using pairs of identical filters.

What is claimed is:

1. An optical add-drop module (OADM) having a through-path, a passband, and an isolation level, the OADM including in the through-path exactly two thin-film filters (TFFs) having respective passbands that approximately coincide in wavelength, each TFF having a reflection characteristic curve, and each TFF having a respective across-the-band isolation level, wherein:

the respective reflection characteristic curves of the two TFFs are at least partially complementary, such that the OADM isolation level exceeds the logarithmic sum of the across-the-band isolation levels of the respective TFFs.

2. The OADM of claim 1, wherein each TFF has a center wavelength, and the center wavelengths of the respective TFFs are offset from each other by at least 1%, but not more than 25%, of the width of each TFF passband.

3. The OADM of claim 2, wherein the OADM passband is at least 1 nm wide but not more than 20 nm wide, and the center wavelengths of the respective TFFs are offset by at least 0.1 nm, but not more than 5 nm.

4. The OADM of claim 3, wherein the OADM passband has a center wavelength in the range 1290–1610 nm.

5. The OADM of claim 1, wherein the OADM isolation level exceeds by at least 1 dB the logarithmic sum of the across-the-band isolation levels of the respective TFFs.

6. A method for manufacturing an OADM having a through-path, a passband and an isolation level, the OADM including in the through-path exactly two thin-film filters (TFFs) having respective passbands that approximately coincide in wavelength, each TFF having a respective across-the-band isolation level, the method comprising:

measuring a reflection characteristic curve of each of two or more TFFs;

selecting a pair of TFFs having reflection characteristic curves that are at least partially complementary, such that the OADM isolation level exceeds the logarithmic sum of the across-the-band isolation levels of the respective TFFs; and assembling the selected pair of TFFs in an OADM.

7. The method of claim 6, wherein the TFFs are selected from respective groups of TFFs fabricated to have different nominal center wavelengths.

8. The method of claim 7, wherein the respective groups of TFFs are fabricated to have nominal center wavelengths that differ by at least 1%, but not more than 25%, of the width of each TFF passband.

9. The method of claim 8, wherein the OADM passband is at least 1 nm wide but not more than 20 nm wide, and the respective groups of TFFs are fabricated to have nominal center wavelengths that differ by at least 0.1 nm, but not more than 5 nm.

* * * * *